(12) United States Patent
Fang et al.

(10) Patent No.: US 10,880,435 B2
(45) Date of Patent: *Dec. 29, 2020

(54) SYSTEMS AND METHODS FOR CUSTOMER SENTIMENT PREDICTION AND DEPICTION

(71) Applicant: CAPITAL ONE SERVICES, LLC, McLean, VA (US)

(72) Inventors: Xu Benjamin Fang, Frisco, TX (US); Lewis Wong, McKinney, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/684,960

(22) Filed: Nov. 15, 2019

(65) Prior Publication Data
US 2020/0106882 A1 Apr. 2, 2020

Related U.S. Application Data

(63) Continuation of application No. 15/997,745, filed on Jun. 5, 2018, now Pat. No. 10,484,540, which is a continuation of application No. 15/664,974, filed on Jul. 31, 2017, now Pat. No. 10,009,465.

(60) Provisional application No. 62/437,714, filed on Dec. 22, 2016.

(51) Int. Cl.
H04M 3/51 (2006.01)
G10L 21/10 (2013.01)
G06Q 30/00 (2012.01)
H04L 12/58 (2006.01)
G10L 25/63 (2013.01)

(52) U.S. Cl.
CPC ........ *H04M 3/5175* (2013.01); *G06Q 30/016* (2013.01); *G10L 21/10* (2013.01); *H04L 51/02* (2013.01); *H04M 3/5166* (2013.01); *G10L 25/63* (2013.01); *H04L 51/04* (2013.01); *H04M 3/5133* (2013.01); *H04M 2203/408* (2013.01); *H04M 2203/556* (2013.01)

(58) Field of Classification Search
CPC ............ H04M 3/5175; H04M 3/5166; H04M 3/5133; H04M 2203/408; H04M 2203/556; G06Q 30/016; G10L 21/10; G10L 25/63; H04L 51/02; H04L 51/04
USPC .................. 379/265.03, 265.01, 266.01, 309
See application file for complete search history.

(56) References Cited

U.S. PATENT DOCUMENTS

| | | |
|---|---|---|
| 8,559,618 B1 | 10/2013 | Cordell et al. |
| 2006/0067508 A1 | 3/2006 | Basson et al. |
| 2011/0185293 A1 | 7/2011 | Barnett et al. |
| 2012/0216175 A1 | 8/2012 | Ross |
| 2014/0270133 A1 | 9/2014 | Conway et al. |
| 2016/0048502 A1 | 2/2016 | Montenegro et al. |

(Continued)

*Primary Examiner* — Quynh H Nguyen
(74) *Attorney, Agent, or Firm* — Troutman Pepper Hamilton Sanders LLP; Christopher J. Forstner; John A. Morrissett

(57) ABSTRACT

A system includes one or more memory devices storing instructions, and one or more processors configured to execute the instructions to perform steps of a method for providing customer sentiment depiction. The system may receive customer information and session information and generate a customer sentiment estimate. The system may then receive an indication of a detected customer voice characteristic and generate an updated customer sentiment estimate that may be transmitted to a customer service terminal for display.

19 Claims, 6 Drawing Sheets

(56) References Cited

U.S. PATENT DOCUMENTS

2016/0117591 A1* 4/2016 Naik .................... G06F 40/242
                                                    707/748
2017/0270099 A1   9/2017 Gorny
2017/0310824 A1  10/2017 Piaggio et al.

* cited by examiner

SYSTEMS AND METHODS FOR CUSTOMER SENTIMENT PREDICTION AND DEPICTION

CROSS-REFERENCE TO RELATED APPLICATION

This application is a continuation of, and claims priority under 35 U.S.C. § 120 to, U.S. patent application Ser. No. 15/997,745, mailed Jun. 5, 2018, which is a continuation of U.S. patent application Ser. No. 15/664,974, now U.S. Pat. No. 10,009,465, filed Jul. 31, 2017, which claims the benefit of U.S. Provisional Application No. 62/437,714, filed Dec. 22, 2016, the entire contents and substance of which are hereby incorporated by reference.

FIELD OF INVENTION

The present disclosure relates to systems and methods for providing customer sentiment depiction, and more particularly providing systems and methods to modify a customer service experience based on an estimate of customer sentiment.

BACKGROUND

Most businesses strive to provide good customer service and make efforts to keep their customers happy. However, despite a company's best efforts, this is not always an easy task to achieve. For example, a customer's opinion about a company is often developed over the course of multiple interactions with the company over time, and while some customers may have had nothing but good experiences, others may have had one or more bad experiences that may heavily influence their perception of the company. Generally, upon receiving a new customer service contact event (e.g., calling a customer service line) from a customer, there is no way for a customer service agent to know whether the customer has had previous experiences, bad or good, with the company. This may be particularly true if a company is organized into different lines of business such that a customer service agent in one line of business may have no information about customer interactions pertaining to a different line of business. Accordingly, it may improve a company's ability to provide good customer service to provide a way to identify and represent the number and nature of previous interactions that a customer has had with the company in order to ascertain whether a particular customer may need more attention.

In addition to previous interactions with a company, a customer's emotional state may also affect the perceived quality of customer service received from a company. Accordingly, a company may be able to improve a customer service experience by identifying customers who are exhibiting traits of being in a negative emotional state or by otherwise predicting which customers may have a negative perception of the company and focusing more attention on those customers. Many customer service systems utilize an automated interactive voice response (IVR) system to interact with a customer before transferring them to a customer service representative, so a customer may have already had a frustrating or bad experience before being connected to a customer service agent. Therefore it would be beneficial to provide a way of assessing a customer's attitude towards the company based on their previous interactions with the company, as well as assessing the customer's emotional state in real time, to provide a customer service agent with an idea of the customer's emotional state or disposition towards the company before engaging with the customer, which may enable the customer service agent to provide a more tailored customer service experience for the customer.

Accordingly, there is a need for improved systems and methods to provide customer sentiment depiction to customer service agents that may allow a customer service agent to provide a customer with a more individualized customer service experience. Embodiments of the present disclosure are directed to this and other considerations.

SUMMARY

Disclosed embodiments provide systems and methods for providing customer sentiment depiction.

Consistent with the disclosed embodiments, the system may include one or more memory devices storing instructions, and one or more processors configured to execute the instructions to perform steps of a method to provide customer sentiment depiction. The system may execute the instructions to receive customer and session information in response to a customer call made to an interactive voice response system. The system may then generate a customer sentiment estimate based on the customer information and session information. The customer sentiment estimate may be indicative of a sentiment of a customer engaging with the interactive voice response system and may be configured to be displayed by a customer service terminal. The system may then receive an indication of a detected customer voice characteristic and generate an updated customer sentiment estimate based on the customer sentiment estimate and the detected customer voice characteristic. The system may then transmit the updated customer service estimate to a customer service terminal for display.

Consistent with the disclosed embodiments, methods for providing customer sentiment depiction are also disclosed.

Further features of the disclosed design, and the advantages offered thereby, are explained in greater detail hereinafter with reference to specific embodiments illustrated in the accompanying drawings, wherein like elements are indicated be like reference designators.

BRIEF DESCRIPTION OF THE DRAWINGS

Reference will now be made to the accompanying drawings, which are not necessarily drawn to scale, and which are incorporated into and constitute a portion of this disclosure, illustrate various implementations and aspects of the disclosed technology and, together with the description, serve to explain the principles of the disclosed technology. In the drawings.

DETAILED DESCRIPTION

Figure 1:
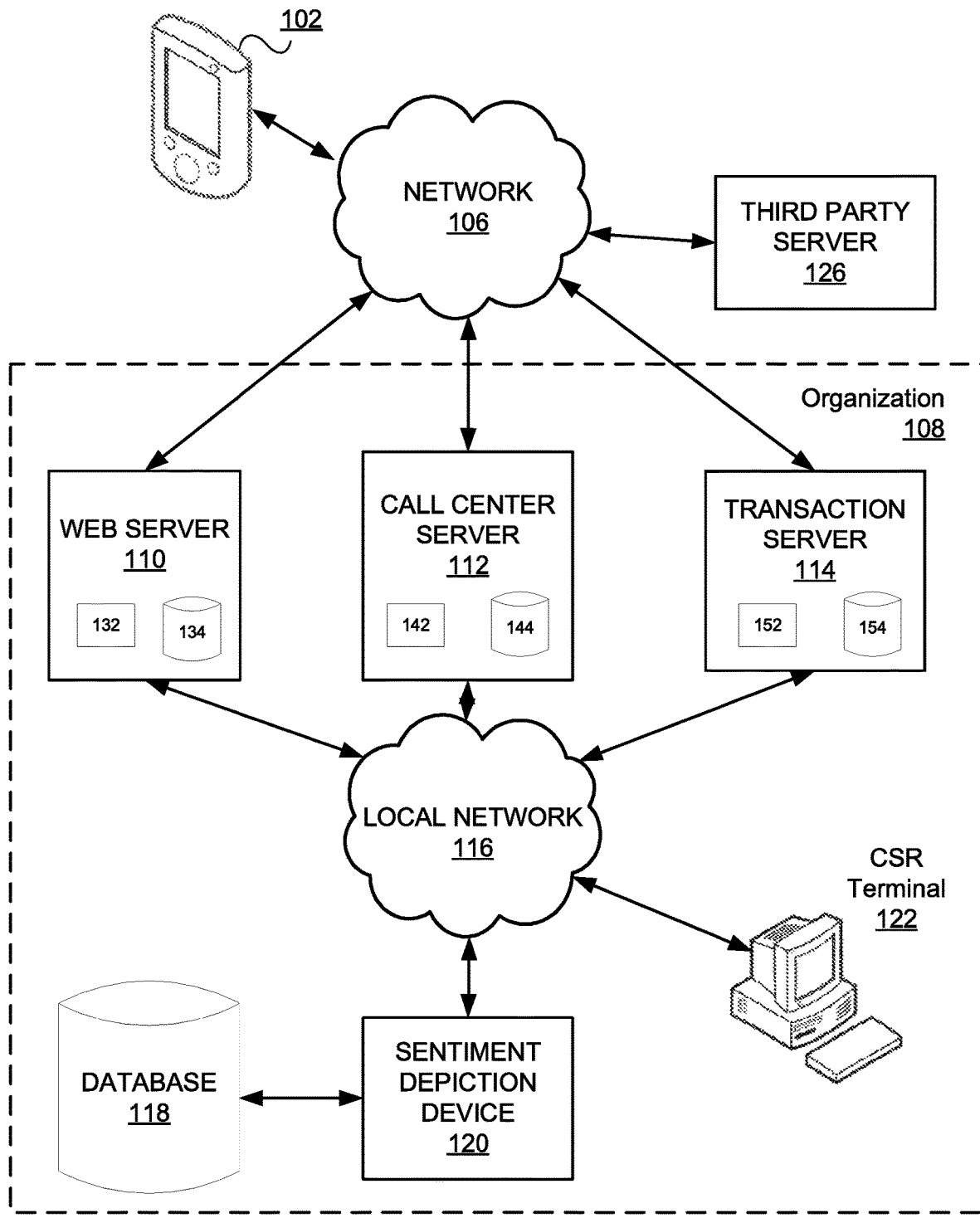
FIG. 1 is a diagram of an exemplary system that may be used to provide customer service depiction.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods. Such other components not described herein may include, but are not limited to, for example, components developed after development of the disclosed technology.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

The disclosed embodiments are directed to systems and methods for providing customer sentiment depiction. The system may include one or more memory devices storing instructions, and one or more processors configured to execute the instructions to perform steps of a method. Specifically, in some embodiments, the system may provide customer sentiment depiction. To accomplish this, the system may execute the instructions to receive customer and session information in response to a customer call made to an interactive voice response system. The system may then generate a customer sentiment estimate based on the customer information and session information. The customer sentiment estimate may be indicative of a sentiment of a customer engaging with the interactive voice response system and may be configured to be displayed by a customer service terminal. The system may then receive an indication of a detected customer voice characteristic and generate an updated customer sentiment estimate based on the customer sentiment estimate and the detected customer voice characteristic. The system may then transmit the updated customer service estimate to a customer service terminal for display.

In another embodiment, a system for providing customer sentiment depiction may include an environmental data sensor for obtaining audio or visual data, a geographic location sensor, an input/output device, a display, one or more processors including at least a sentiment depiction processor, and a memory in communication with the one or more processors. The memory in communication with the one or more processors may store instructions that, when executed by the one or more processors, are configured to cause the system to receive customer information and session information in response to a customer call made to an interactive voice response system. The system may then obtain customer audio information by the environmental data sensor and determine, by the sentiment depiction processor, a customer voice characteristic based on the customer audio information. The system may then generate, a customer sentiment estimate based on the customer information, session information, and the customer voice characteristic. The customer sentiment estimate may be indicative of a sentiment of a customer engaging with the interactive voice response system and may be configured to be displayed by a customer service terminal. The system may then transmit the customer sentiment estimate to a call center server for display via the input/output device.

In another embodiment, a system for providing customer sentiment depiction may include one or more memory devices storing instructions, and one or more processors configured to execute the instructions to perform steps of a method. Upon executing the instructions, the system may receive customer information and session information in response to a customer interaction with a customer service system. The system may generate a first customer sentiment estimate based on the customer information and session information. The customer sentiment estimate may be indicative of a sentiment of a customer engaging with a customer service system and may be configured to be displayed by a customer service terminal. The system may receive an indication of a detected customer action or customer voice characteristic and generate a second customer sentiment estimate based on the indication of the detected customer action or customer voice characteristic. The second customer sentiment estimate may represent an update to the first customer sentiment estimate based on the detected user action or customer voice characteristic and may be configured for display by a customer service terminal. The system may then output an indication of the second customer sentiment estimate to the customer service terminal for display.

Although the above embodiments are described with respect to systems, it is contemplated that embodiments with identical or substantially similar features may alternatively be implemented as methods and/or non-transitory computer-readable media.

Reference will now be made in detail to exemplary embodiments of the disclosed technology, examples of which are illustrated in the accompanying drawings and disclosed herein. Wherever convenient, the same references numbers will be used throughout the drawings to refer to the same or like parts.

FIG. 1 is a diagram of an exemplary system 100 that may be configured to perform one or more processes that can provide customer sentiment depiction that may estimate a customer's sentiment and display a representation of the customer sentiment estimate to a customer service agent. The components and arrangements shown in FIG. 1 are not intended to limit the disclosed embodiments as the components used to implement the disclosed processes and features may vary. As shown, system 100 may include a user device 102, a network 106, and an organization 108 including, for example, a web server 110, a call center server 112, a transaction server 114, a local network 116, a sentiment depiction device 120, a database 118, an customer service representative (CSR) terminal 122 (which may also be referred to as a customer service terminal), and a third party server 126.

In some embodiments, a customer may operate user device 102. User device 102 can include one or more of a mobile device, smart phone, general purpose computer, tablet computer, laptop computer, telephone, PSTN landline, smart wearable device, voice command device, other mobile computing device, or any other device capable of communicating with network 106 and ultimately communicating with one or more components of organization 108. In some embodiments, a user device may include or incorporate electronic communication devices for hearing or vision impaired users. User device 102 may belong to or be provide by a customer, or may be borrowed, rented, or shared. Customers may include individuals such as, for example, subscribers, clients, prospective clients, or customers of organization 108, such as individuals who have obtained, will obtain, or may obtain a product, service, or consultation from organization 108. According to some embodiments, user device 102 may include an environmental sensor for obtaining audio or visual data, such as a microphone and/or digital camera, a geographic location sensor for determining the location of the device, an input/output device such as a transceiver for sending and receiving data, a display for displaying digital images, one or more processors including a sentiment depiction processor, and a memory in communication with the one or more processors.

Network 106 may be of any suitable type, including individual connections via the internet such as cellular or WiFi networks. In some embodiments, network 106 may connect terminals, services, and mobile devices using direct connections such as radio-frequency identification (RFID), near-field communication (NFC), Bluetooth™, low-energy Bluetooth™ (BLE), WiFi™, ZigBee™, ambient backscatter communications (ABC) protocols, USB, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

Network 106 may comprise any type of computer networking arrangement used to exchange data. For example, network 106 may be the Internet, a private data network, virtual private network using a public network, and/or other suitable connection(s) that enables components in system environment 100 to send and receive information between the components of system 100. Network 106 may also include a public switched telephone network ("PSTN") and/or a wireless network.

Third party server 126 may comprise a computer system associated with an entity other than organization 108 and customers that performs one or more functions associated with the individual and organization 108. For example, third party server 126 can comprise an automated teller machine (ATM) system that allows customer to withdraw money from an account managed by organization 108. As another example, third party server 126 may comprise a server associated with a store where customer intends to make a purchase using funds held in an account that organization 108 manages. As another example, third party server 126 may comprise a computer system associated with a product repair service that submits a warranty claim for a product that customer purchased from organization 108.

Organization 108 may include an entity such as a business, corporation, individual, partnership, or any other entity that provides one or more of goods, services, and consultations to individuals such as customers.

Organization 108 may include one or more servers and computer systems for performing one or more functions associated with products and/or services that organization 108 provides. Such servers and computer systems may include, for example, web server 110, call center server 112, and/or transaction server 114, as well as any other computer systems necessary to accomplish tasks associated with organization 108 or the needs of customers. Web server 110 may include a computer system configured to generate and provide one or more websites accessible to customers, as well as any other individuals involved in organization 108's normal operations. Web server 110 may have one or more processors 132 and one or more web server databases 134, which may be any suitable repository of website data. Information stored in web server 110 may be accessed (e.g., retrieved, updated, and added to) via local network 116 and/or network 106 by one or more devices (e.g., sentiment depiction device 120) of system 100. In some embodiments, processor 132 may be used to implement an automated customer service system that may interact with a customer via a website.

Call center server 112 may include a computer system configured to receive, process, and route telephone calls and other electronic communications between a customer operating user device 102, and an employee operating CSR terminal 122. Call center server 110 may have one or more processors 142 and one or more call center databases 144, which may be any suitable repository of call center data. Information stored in call center server 110 may be accessed (e.g., retrieved, updated, and added to) via local network 116 and/or network 106 by one or more devices (e.g., sentiment depiction device 120) of system 100. In some embodiments, call center server processor 142 may be used to implement an IVR system that interacts with the customer over the phone.

Transaction server 114 may include a computer system configured to process one or more transactions involving an account associated with customers, or a request received from customers. In some embodiments, transactions can include, for example, a product/service purchase, product/service return, financial transfer, financial deposit, financial withdrawal, financial credit, financial debit, dispute request, warranty coverage request, and any other type of transaction associated with the products and/or services that organization 108 provides to individuals such as customers. Transaction server 110 may have one or more processors 152 and one or more transaction server databases 154, which may be any suitable repository of transaction data. Information stored in transaction server 110 may be accessed (e.g., retrieved, updated, and added to) via local network 116 and/or network 106 by one or more devices (e.g., sentiment depiction device 120) of system 100.

In some embodiments, transaction server 114 tracks and stores event data regarding interactions between a third party, such as third party server 126, with organization 108, on behalf of the individual. For example, transaction server 114 may track third party interactions such as purchase requests, refund requests, warranty claims, account withdrawals and deposits, and any other type of interaction that third party server 126 may conduct with organization 108 on behalf of an individual such as customer.

Local network 116 may comprise any type of computer networking arrangement used to exchange data in a localized area, such as WiFi, Bluetooth™ Ethernet, and other suitable network connections that enable components of organization 108 to interact with one another and to connect to network 106 for interacting with components in system environment 100. In some embodiments, local network 116 may comprise an interface for communicating with or linking to network 106. In other embodiments, components of organization 208 may communicate via network 106, without a separate local network 116.

Sentiment depiction device 120 may comprise one or more computer systems configured to compile data from a plurality of sources, such as web server 110, call center server 112, and transaction server 114, correlate compiled data, analyze the compiled data, arrange the compiled data, generate derived data based on the compiled data, and storing the compiled and derived in a database such as database 118. According to some embodiments, database 118 may be a database associated with organization 108 that stores a variety of information relating to customers, transactions, and business operations. Database 118 may also serve as a back-up storage device and may contain data and information that is also stored on, for example, databases 134, 144, 154, 260, 270, and 280. Database 118 may be accessed by sentiment depiction device 120 and may be used to store historical customer sentiment estimates so that customers' dispositions may be tracked over time.

CSR terminal 122 may be, but is not limited to a terminal, a desktop computer, a laptop computer, a mobile device such as a smart phone or tablet device, and any other computerized devices configured to communicate with local network 116 to perform various functions relating to organization 108 such as, for example, receiving telephone calls and conducting teleconferences with customer, viewing one or more interfaces generated by sentiment depiction device 120, and any other functions associated with organization 108's products or services including analyzing individuals' data, placing orders, cancelling orders, issuing credits and refunds, processing withdrawals, deposits, and transfers, and other functions relating to products, services, or accounts associated with customer. An employee may operate CSR terminal 122, and the employee may comprise any individual employed by organization 108 or involved in the operations of organization 108 including, for example, a customer service agent, an account manager, a product or service manager, a clerk, etc. In some embodiments, an employee may instruct sentiment depiction device 120 to generate an interface depicting a customer sentiment estimate based on customer sentiment data, such as customer information and session information, or may otherwise passively receive a depiction of customer sentiment for display at CSR terminal 122. In some embodiments, customers may access their own customer sentiment data or customer sentiment depiction, for example, user device 102, or using any other suitable computing device. In some embodiments, a person or entity other than the employee or customers may access the customer sentiment data or customer sentiment depiction for an individual such as, for example, a shared account holder or a data analyst. Additionally, in some embodiments organization 108 may comprise a plurality of CSR terminals 122 and employees, and various CSR terminals 122 may serve varying functions for organization 108. As an example, a first CSR terminal 122 may provide call center functions for an employee performing the duties of a customer service representative. As another example, a second CSR terminal 122 may provide data analytic functions for an employee performing the duties of a data analyst. In both examples, the CSR terminals 122 may access individuals' customer sentiment data or customer sentiment depiction.

Although the preceding description describes various functions of a web server 110, call center server 112, transaction server 114, sentiment depiction device 120, database 118, and a CSR terminal 122, in some embodiments, some or all of these functions may be carried out by a single computing device.

According to some embodiments, system 100 may include an application program interface (API) to implement some or all of the functions of the invention. For example, in some embodiments, CSR terminal 122 may store and execute an API that may interface with and obtain real time data on the customer status (e.g., whether a customer is in bankruptcy), products, local weather/events (e.g., whether the customer is in a disaster area), nearby landmarks, public records relating to the customer or their location, and other such information from other devices (e.g., user device 102, sentiment depiction device 120) to ultimately produce and/or display customer sentiment estimates. It will be appreciated by those of skill in the art that although the API is described herein as residing on the CSR terminal 122, in various embodiments the API may reside on any number of other devices, such as for example, the web server 110, call center server 112, transaction server 114, sentiment depiction device 120, or user device 102.

In certain embodiments, a real-time API consistent with certain disclosed embodiments may use Representational State Transfer (REST) style architecture, and in this scenario, the real time API may be called a RESTful API.

In certain embodiments, the real-time API may include a set of Hypertext Transfer Protocol (HTTP) request messages and a definition of the structure of response messages. In certain aspects, the API may allow a software application, which is written against the API and installed on a client (such as, for example, a CSR terminal 122) to exchange data with a server (such as, for example, sentiment depiction device 120) that implements the API, in a request-response pattern. In certain embodiments, the request-response pattern defined by the API may be configured in a synchronous fashion, and require that the response be provided in real-time. In some embodiments, a response message from the server to the client through the API consistent with the disclosed embodiments may be in the format including, for example, Extensible Markup Language (XML), JavaScript Object Notation (JSON), and/or the like.

In some embodiments, the API design may also designate specific request methods for a client to access the server. For example, the client may send GET and POST requests with parameters URL-encoded (GET) in the query string or form-encoded (POST) in the body (e.g., a form submission). Additionally or alternatively, the client may send GET and POST requests with JSON serialized parameters in the body. Preferably, the requests with JSON serialized parameters use "application/json" content-type. In another aspect, the API design may also require the server implementing the API return messages in JSON format in response to the request calls from the client.

For ease of discussion, embodiments may be described in connection with the generation of a customer sentiment estimate in the context of a customer service call to an IVR system or through interactions with a website. It is to be understood, however, that disclosed embodiments are not limited to customer service calls and may be used in many other contexts. Further, steps or processes disclosed herein are not limited to being performed in the order described, but may be performed in any order, and some steps may be omitted, consistent with the disclosed embodiments.

The features and other aspects and principles of the disclosed embodiments may be implemented in various environments. Such environments and related applications may be specifically constructed for performing the various processes and operations of the disclosed embodiments or they may include a general purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low level software instructions, such as machine code (e.g., such as that produced by a compiler) and/or high level code that can be executed by a processor using an interpreter.

Figure 2:
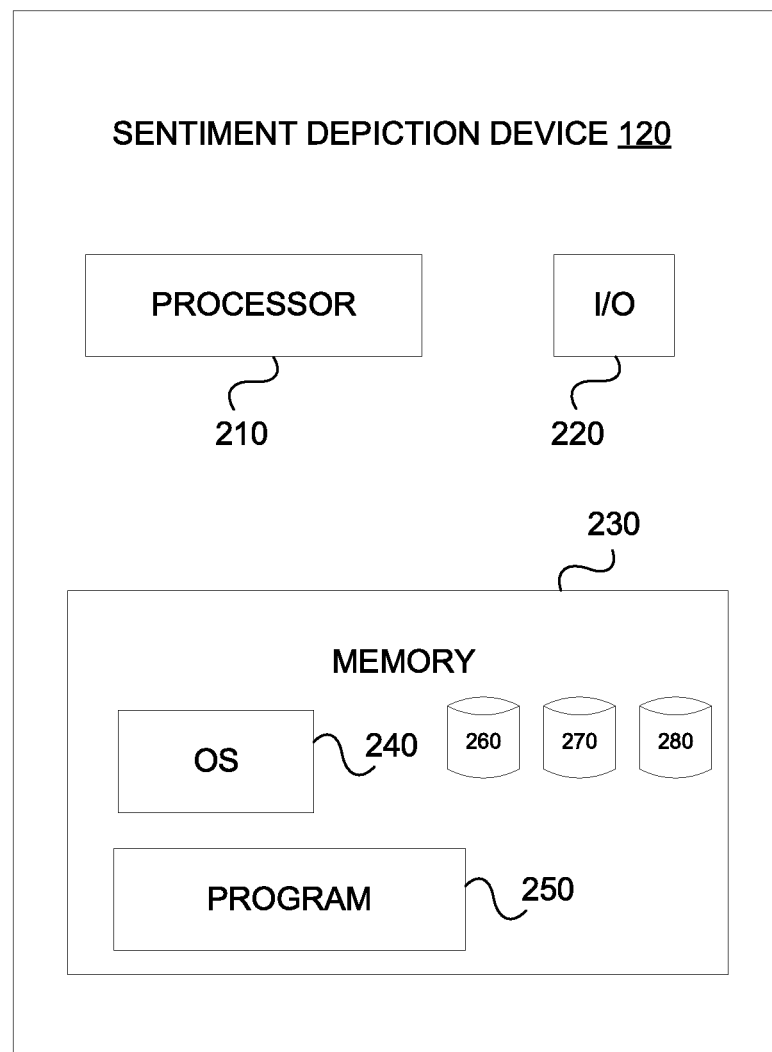
FIG. 2 is a component diagram of an exemplary sentiment depiction device.

An exemplary embodiment of sentiment depiction device 120 is shown in more detail in FIG. 2. User device 102, web server 110, call center server 112, transaction server 114, CSR terminal 122, and third party server 126 may have a similar structure and components that are similar to those described with respect to sentiment depiction device 120. As shown, sentiment depiction device 120 may include a processor 210, an input/output ("I/O") device 220, a memory 230 containing an operating system ("OS") 240 and a program 250. For example, sentiment depiction device 120 may be a single server or may be configured as a distributed computer system including multiple servers or computers that interoperate to perform one or more of the processes and functionalities associated with the disclosed embodiments. In some embodiments, the sentiment depiction device 120 may further include a peripheral interface, a transceiver, a mobile network interface in communication with the processor 210, a bus configured to facilitate communication between the various components of the sentiment depiction device 120, and a power source configured to power one or more components of the sentiment depiction device 120.

A peripheral interface may include the hardware, firmware and/or software that enables communication with various peripheral devices, such as media drives (e.g., magnetic disk, solid state, or optical disk drives), other processing devices, or any other input source used in connection with the instant techniques. In some embodiments, a peripheral interface may include a serial port, a parallel port, a general purpose input and output (GPIO) port, a game port, a universal serial bus (USB), a micro-USB port, a high definition multimedia (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, ZigBee™, ambient backscatter communications (ABC) protocols or similar technologies.

A mobile network interface may provide access to a cellular network, the Internet, or another wide-area network. In some embodiments, a mobile network interface may include hardware, firmware, and/or software that allows the processor(s) 210 to communicate with other devices via wired or wireless networks, whether local or wide area, private or public, as known in the art. A power source may be configured to provide an appropriate alternating current (AC) or direct current (DC) to power components.

Processor 210 may include one or more of a microprocessor, microcontroller, digital signal processor, co-processor or the like or combinations thereof capable of executing stored instructions and operating upon stored data. In some embodiments, processor 210 may be a sentiment depiction processor that may execute predictive modeling to generate customer sentiment estimates based on a variety of input data. Memory 230 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein are implemented as a combination of executable instructions and data within the memory 230.

Processor 210 may be one or more known processing devices, such as a microprocessor from the Pentium™ family manufactured by Intel™ or the Turion™ family manufactured by AMD™. Processor 210 may constitute a single core or multiple core processor that executes parallel processes simultaneously. For example, processor 210 may be a single core processor that is configured with virtual processing technologies. In certain embodiments, processor 210 may use logical processors to simultaneously execute and control multiple processes. Processor 210 may implement virtual machine technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

Sentiment depiction device 120 may include one or more storage devices configured to store information used by processor 210 (or other components) to perform certain functions related to the disclosed embodiments. In one example sentiment depiction device 120 may include memory 230 that includes instructions to enable processor 210 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

In one embodiment, sentiment depiction device 120 may include memory 230 that includes instructions that, when executed by processor 210, perform one or more processes consistent with the functionalities disclosed herein. Methods, systems, and articles of manufacture consistent with disclosed embodiments are not limited to separate programs or computers configured to perform dedicated tasks. For example, sentiment depiction device 120 may include memory 230 that may include one or more programs 250 to perform one or more functions of the disclosed embodiments. Moreover, processor 210 may execute one or more programs 250 located remotely from system 100. For example, system 100 may access one or more remote programs 250, that, when executed, perform functions related to disclosed embodiments.

Memory 230 may include one or more memory devices that store data and instructions used to perform one or more features of the disclosed embodiments. Memory 230 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. Memory 230 may include software components that, when executed by processor 210, perform one or more processes consistent with the disclosed embodiments. In some embodiments, memory 230 may include a customer account database 260, a customer interaction database 270, and a customer feedback database 280 for storing related data to enable sentiment depiction device 120 to perform one or more of the processes and functionalities associated with the disclosed embodiments. Customer account database 260 may include stored data relating to customer accounts, such as for example, customer identification information (e.g., name, age, sex, birthday, address, VIP status, key customer status, preferences, preferred language, vehicle(s) owned, greeting name, channel, talking points (e.g., favorite sports team), etc.), bank accounts, mortgage loan accounts, car loan accounts, and other such accounts. Customer account data stored in customer account database 260 may include account numbers, authorized users associated with one or more accounts, account balances, account payment history, and other such typical account information. Customer interaction database 270 may include stored data relating to previous interactions between the organization 108 and a customer. For example, customer interaction database 270 may store customer interaction data that includes records of previous customer service interactions with a customer via a website, IVR system, or speaking with a customer service agent. Customer interaction data may also include information about business transactions between organization 108 and a customer. Customer feedback database 280 may include stored data relating to a communications received from customer that reflect upon a customer's experience with organization 108. For example, customer feedback data stored by customer feedback database 280 may include online surveys filled out by a customer, surveys answered by a customer following previous calls to the company, digital feedback provided through websites or mobile application associated with the organization 108 (e.g., selecting a smiley face or thumbs up to indicate approval), reviews written by a customer, complaint forms filled out by a customer, information obtained from verbal interactions with customer (e.g., information derived from a transcript of a customer service call with customer that is generated using, for example, voice recognition techniques) or any other types of communications from a customer to organization 108. Although these databases 260, 270, 280 have been described as being separate databases for the purposes of the present discussion, these databases may alternately be combined into one or more databases.

Sentiment depiction device 120 may also be communicatively connected to one or more memory devices (e.g., databases (not shown)) locally or through a network. The remote memory devices may be configured to store information and may be accessed and/or managed by sentiment depiction device 120. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

Sentiment depiction device 120 may also include one or more I/O devices 220 that may comprise one or more interfaces for receiving signals or input from devices and providing signals or output to one or more devices that allow data to be received and/or transmitted by sentiment depiction device 120. For example, sentiment depiction device 120 may include interface components, which may provide interfaces to one or more input devices, such as one or more keyboards, mouse devices, touch screens, track pads, trackballs, scroll wheels, digital cameras, microphones, sensors, and the like, that enable sentiment depiction device 120 to receive data from one or more users (such as, for example, via user device 102).

In exemplary embodiments of the disclosed technology, sentiment depiction device 120 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

While sentiment depiction device 120 has been described as one form for implementing the techniques described herein, those having ordinary skill in the art will appreciate that other, functionally equivalent techniques may be employed. For example, as known in the art, some or all of the functionality implemented via executable instructions may also be implemented using firmware and/or hardware devices such as application specific integrated circuits (ASICs), programmable logic arrays, state machines, etc. Furthermore, other implementations of the sentiment depiction device 120 may include a greater or lesser number of components than those illustrated.

Figure 6:
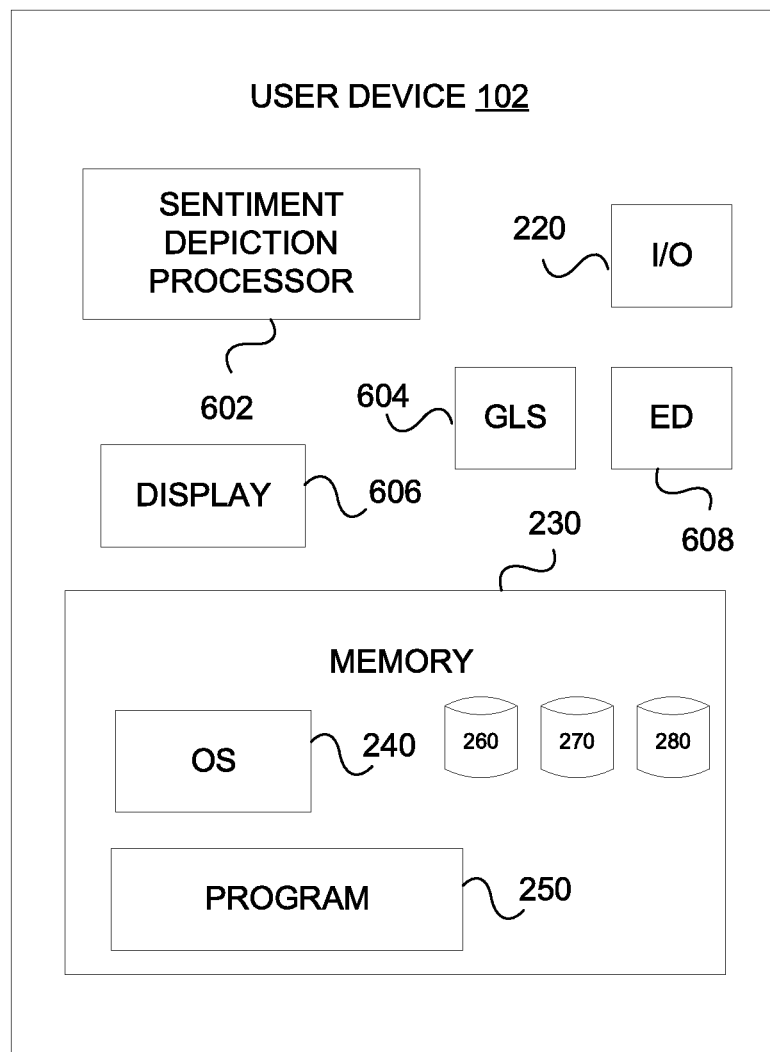
FIG. 6 is a component diagram of an exemplary user device.

FIG. 6 shows an exemplary interactive embodiment of a user device 102. As shown, user device 102 may include an input/output ("I/O") device 220, a memory 230 containing an operating system ("OS") 240 and a program 250 and all associated components as described above with respect to sentiment depiction device 120. User device 102 may also include a sentiment depiction processor 602 for generating customer sentiment estimates, a geographic location sensor ("GLS") 604 for determining the geographic location of user device 102, a display 606 for displaying digital images, and an environmental data ("ED") sensor 608 for detecting audio and/or visual data. In some embodiments, an environmental data sensor 608 may include a microphone or a digital camera. In some embodiments, user device 102 may include one or more processors. According to some embodiments, sentiment depiction processor 602 may include all of the features and functions of processor 210 described above.

Figure 3:
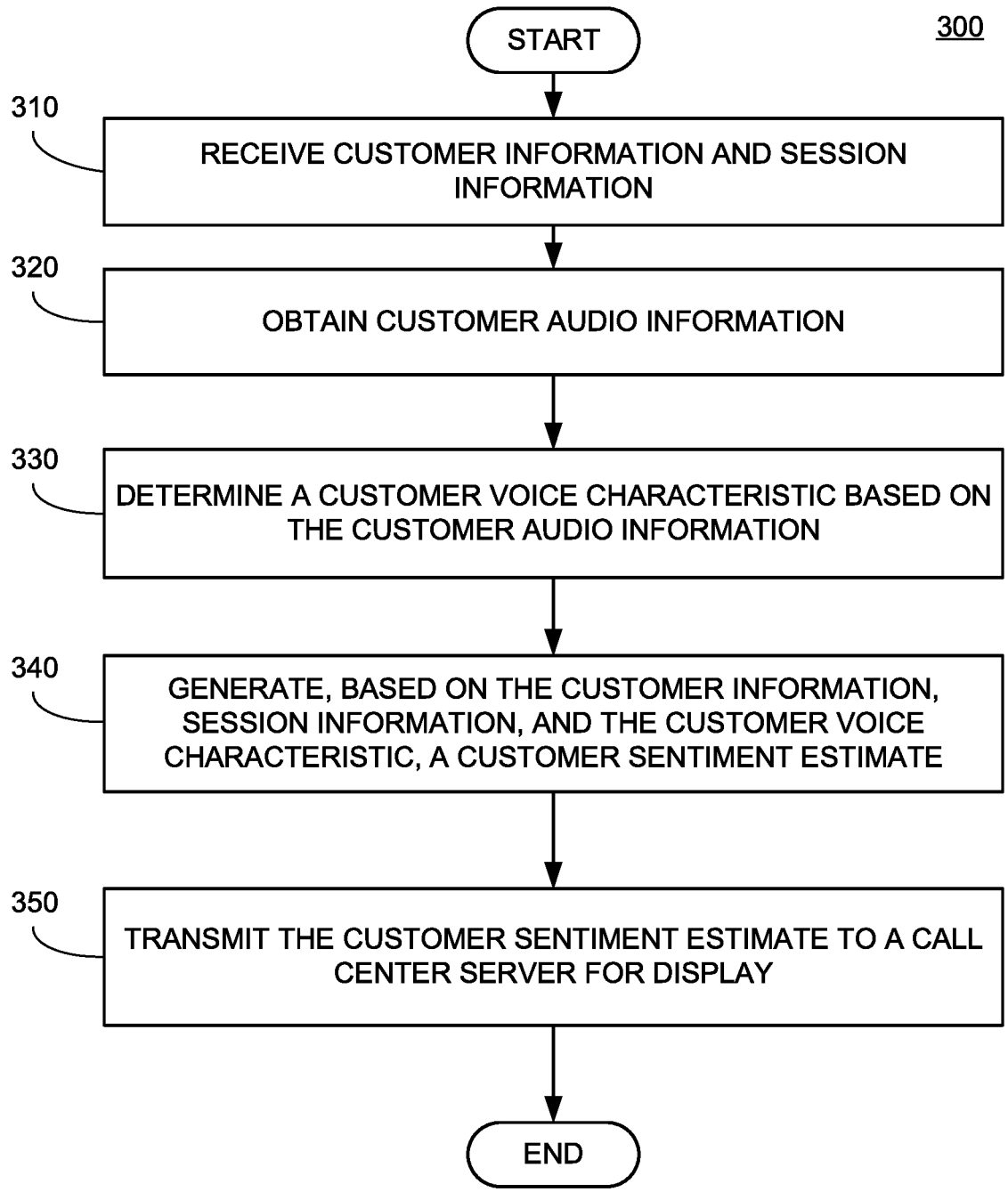
FIG. 3 is a flowchart of an exemplary system for providing customer sentiment depiction.

FIG. 3 shows a flowchart of method 300 for providing customer sentiment depiction. Method 300 may be performed by user device 102 using a processor to execute memory. In some embodiments, user device 102 may include an environmental data sensor for obtaining audio or visual data, such as a microphone and a camera, respectively, and a geographic location sensor for determining the location of user device 102. User device 102 may also include an input/output device, such as a transceiver for sending and receiving data, and a display for displaying digital images. Further, user device 102 may include one or more processors, including a sentiment depiction processor 602 for performing some of all of the steps of the method. In some embodiments, one or more steps of method 300 may be delegated to other elements in system 100, such as the web server 110, the call center server 112, the transaction server 114, the sentiment depiction device 120, or the CSR terminal 122. Following method 300, the system 100 may generate a depiction of an estimate of customer sentiment for display at, for example, CSR terminal 122.

In block 310, user device 102 may receive customer information and session information in response to a customer call made to an interactive voice response system (IVR system). For example, user device 102 may place a call to organization 108 and be connected to an IVR system of call center server 112. In some embodiments, customer information may include customer account data, customer interaction data, and/or customer feedback data. In some embodiments, session information may include information relating to the customer service call session, such as for example, the amount of time the customer had to wait before being connected to an IVR system or a customer service agent, the amount of time a customer interacted with an IVR system before being connected to a customer service agent, customer inputs received in response to prompts from the IVR system, such as authentication data and responses to questions posed by the IVR system, the topic or nature of inquiry raised by the customer, the location of the customer (e.g., obtained via a geographic location sensor of user device 102 and communicated to call center server 112), and any other information relating to the customer's interaction with the system 100 in the immediate instance.

At block 320, user device 102 may obtain customer audio information by the environmental data sensor. For example, a microphone of user device 102 may detect a voice signal of the customer using user device 102. According to some embodiments, the audio information detected by user device 102 may be stored in memory and may be accessed for analysis.

At block 330, user device 102 may determine (e.g., via the sentiment depiction processor 602) a customer voice characteristic based on the customer audio information. According to some embodiments, a customer voice characteristic may be detected by analyzing an audio signal obtained from, for example, a microphone of user device 102. In some embodiments, a customer voice characteristic may include one or more of a customer's accent, tone (or pitch) of voice, rate of speech, volume level, diction, or a particular word or phrase spoken by the customer. As will be appreciated by those of skill in the art, detected customer voice characteristics may be used by the system 100 as an input to model, predict, or estimate the customer's sentiment or mood.

At block 340, user device 102 may generate a customer sentiment estimate based on the customer information, session information, and the customer voice characteristic. According to some embodiments, the sentiment depiction processor 602 of user device 102 may utilize predictive modeling to generate the customer sentiment estimate using some or all of the data included in the customer information, session information, the customer voice characteristic, as well as previous customer sentiment estimates associated with the customer. For example, predictive modeling may use machine learning techniques and algorithms to select relevant attributes from all of the data included in the customer information, session information and the customer voice characteristic to determine an estimate of the customer's current sentiment and determine actions that may serve to improve the customer's sentiment. In some embodiments, information input by a customer service representative regarding their perception of the customer's sentiment during an interaction with the customer may also be included in the analysis. According to some embodiments, the customer sentiment estimate may be indicative of a sentiment of a customer engaging with the interactive voice response system and may represent the customer's estimated level of happiness according to a predetermined scale. In addition to an estimated level of happiness, in some embodiments, the customer sentiment estimate may provide predictions associated with attrition and complaints associated with a customer. In some embodiments, the customer sentiment estimate may be configured to be displayed on a device, such as, for example, CSR terminal 122. For example, a customer sentiment estimate may be displayed as a dynamic icon, such as digital sentiment gauge that changes color to indicate the estimated sentiment or mood of a customer.

At block 350, user device 102 may transmit (e.g., via an input/output device 220 over network 106) the customer service estimate to a call center server for display. In some embodiments, the customer service estimate may be displayed by the call center server 112 or the call center server 112 may transmit the customer service estimate to another device for display, such as CSR terminal 122. In this manner, the user device 102 may be enabled to generate a customer sentiment estimate that indicates the sentiment of the customer and may be displayed to a customer service agent of organization 108 so that the customer service agent may provide more individualized service to the customer.

Figure 4:
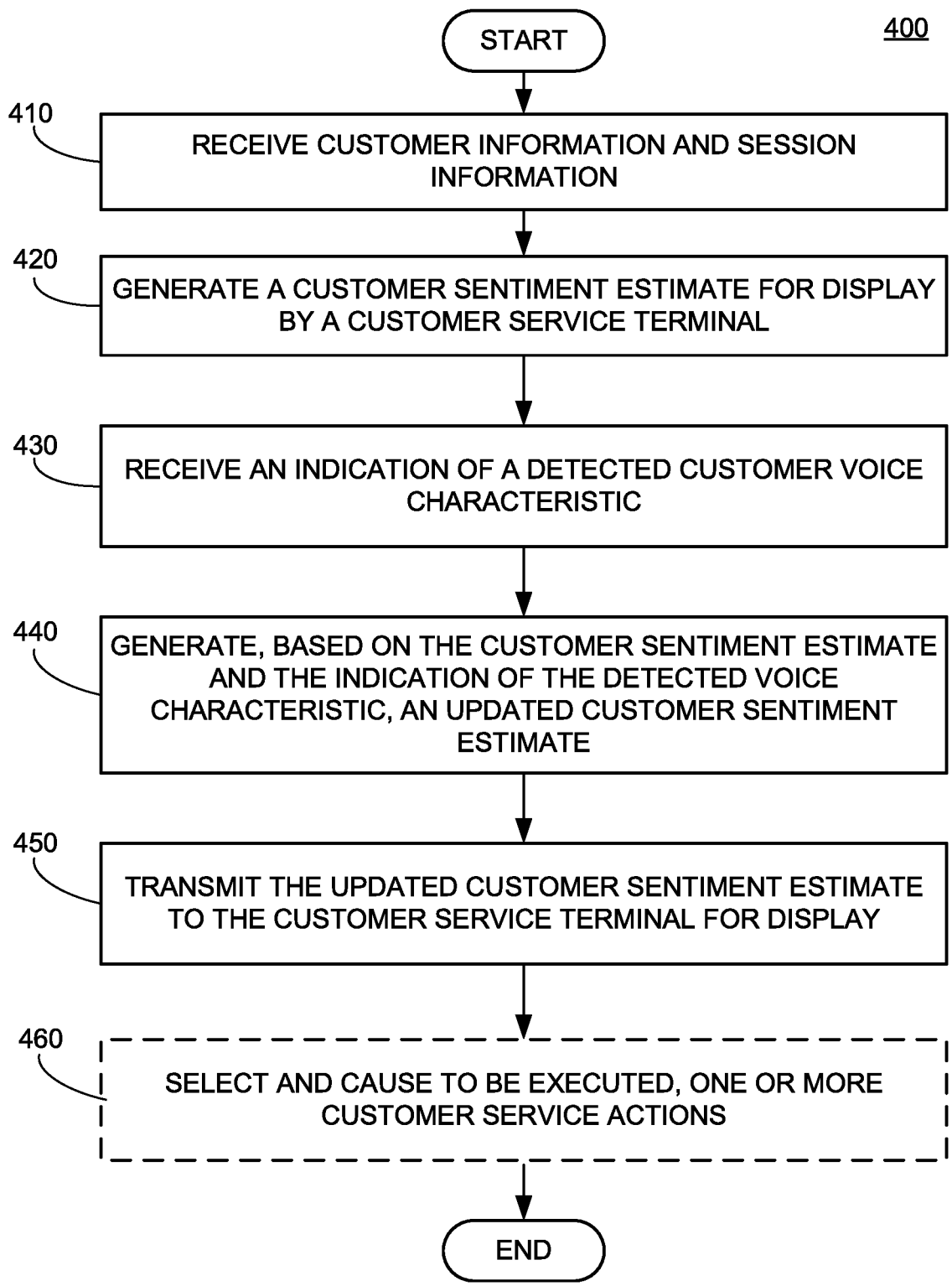
FIG. 4 is a flowchart of an exemplary system for providing customer sentiment depiction.

FIG. 4 shows a flowchart of a method 400 for providing customer service depiction. Method 400 may be performed by sentiment depiction device 120 using processor 210 to execute memory 230. In some embodiments, steps of method 400 may be delegated to other elements in system 100, such as user device 102, web server 110, call center server 112, transaction server 114, or CSR terminal 122. Following method 400, the system may generate a depiction of an estimate of customer sentiment for display at, for example, CSR terminal 122.

In block 410, sentiment depiction device 120 may receive customer information and session information in response to a customer call made to a customer service line associated with organization 108. For example, a sentiment depiction device 120 may receive customer information and session information in response to a customer initiating a call to call center server 112 using user device 102. In some embodiments, customer information may include customer account data, customer interaction data, and/or customer feedback data. In some embodiments, session information may include information relating to the customer service call session, such as for example, the amount of time the customer had to wait before being connected to an IVR system or a customer service agent (i.e., the hold time), the number of transfers the customer has experienced during the call session, the amount of time a customer interacted with an IVR system before being connected to a customer service agent, customer inputs received in response to prompts from the IVR system, such as authentication data and responses to questions posed by the IVR system, the topic or nature of inquiry raised by the customer, the location of the customer (e.g., obtained via a geographic location sensor of user device 102 or a reverse lookup on a PSTN telephone and communicated to call center server 112), customer interactions with the IVR system, and any other information relating to the customer's interaction with the system 100 in the immediate instance.

After receiving the customer information and session information, at step 420, the sentiment depiction device 120 may generate, based on the customer information and session information, a customer sentiment estimate that is indicative of a sentiment of the customer engaging with the IVR system. In some embodiments, the customer sentiment estimate may be configured to be displayed on a customer service terminal (i.e., a CSR terminal 122). In some embodiments, a customer sentiment estimate may represent a customer's estimated level of happiness according to a predetermined scale. For example, according to some embodiments, a customer sentiment estimate may be displayed as a score on a scale of 1-100, or may be displayed as a colored icon where different colors represent different levels of happiness or different emotional states. In some embodiments, a customer sentiment estimate may include displayable information relating to past transactions, past interactions, or business accounts associated with the customer. In some embodiments, a customer sentiment estimate may also include details about the customer, such as how long they have been a customer or whether they are a VIP that should be treated with more attention. In some embodiments, a customer sentiment estimate may also include authentication details obtained from a customer by the IVR system so that when displayed to a customer service agent, the agent can avoid requesting that the customer provide authentication information a second time. According to some embodiments, the customer sentiment estimate may be generated using predictive modeling based on the customer information and the session information. For example, predictive modeling may use machine learning techniques and algorithms to select relevant attributes from all of the data included in the customer information, session information and the customer voice characteristic to determine an estimate of the customer's current sentiment and determine actions that may serve to improve the customer's sentiment. In some embodiments, information input by a customer service representative regarding their perception of the customer's sentiment during an interaction with the customer may also be included in the analysis. Using predictive modeling, it may be possible to predict the customer's sentiment based on the customer's past interactions with the organization 108, feedback received from the customer (e.g., surveys filled out by the customer), and information pertaining to the current customer service call, such as how long the customer has been on hold for or whether it is raining at the location of the customer.

At block 430, the sentiment depiction device 120 may receive an indication of a detected customer voice characteristic, from, for example, user device 102 or call center server 112. According to some embodiments, a voice characteristic may be detected by analyzing an audio signal obtained from, for example, a microphone of a user device 102. In some embodiments, a customer voice characteristic may include one or more of a customer's accent, tone of voice, rate of speech, volume level, diction, a particular word or phrase spoken by the customer, or changes in any of these characteristics over time. In some embodiments, a voice characteristic may be obtained from, for example metadata associated with text, in cases where a voice recognition or voice-to-text application is used to generate the text.

At block 440, the sentiment depiction device 120 may generate an updated customer sentiment estimate based on the customer sentiment estimate and the indication of the detected voice characteristic. According to some embodiments, the updated customer sentiment estimate may represent an updated version of the customer sentiment estimate generated at step 420. For example, the detected customer voice characteristic may indicate that the customer has an angry tone of voice, and accordingly the depiction of the customer sentiment estimate may change colors to indicate that the customer is estimated to be angrier than they were previously estimated to be. According to some embodiments, the updated customer sentiment estimate may be generated using predictive modeling performed by sentiment depiction device 120 (e.g., via processor 210).

After generating an updated customer sentiment estimate, at block 450, sentiment depiction device 120 may transmit the updated customer sentiment estimate to the CSR terminal 122 for display. According to some embodiments, the customer sentiment estimate may repeatedly/continuously update as more customer voice characteristics are detected by the system 100. Accordingly, in some embodiments, a customer service agent utilizing CSR terminal 122 may view a constant or intermittently changing depiction of the customer sentiment estimate, providing a visual indication to the customer service agent of how the sentiment of the customer is changing as the agent speaks with the customer. In some embodiments, this changing estimate may be tracked, recorded, and stored in a database for further analysis.

Optionally, according to some embodiments, at step 460, the sentiment depiction device 120 may select and cause to be executed, one or more customer service actions. In some embodiments the system 100 may execute a customer service action in response to generating an updated customer sentiment estimate. A customer service action may be an action that is automatically carried out by the system 100 to modify or improve the customer service experience of the customer. For example, customer service actions may include, displaying or modifying a script for interacting with the customer, routing the customer call to a particular customer service agent or to a particular group of customer service agents based on the customer's sentiment, accent, or some other customer characteristic, presenting information to the customer or customer service agent based on the customer's preferences, and changing the position of the customer call in a queue to speak with a customer service agent. A script for interacting with the customer may be displayed or modified to provide a more personal experience. For example, if the customer's birthday is coming up soon, the script may be modified to include a statement about the customer's birthday, or if a customer submitted a bad review or survey in the past, a script may be modified to address the concerns of the bad review or survey, or if the customer sentiment estimate indicates that the customer is frustrated, a script may be modified to say, for example, "We understand you are frustrated with the situation and we deeply apologize and appreciate your patience in resolving this issue." It should be understood that a script for interacting with a customer may be stored on sentiment depiction device 120, database 118, call center 112, employee terminal 112, or some other device, and accordingly the sentiment depiction device 120 may access and modify the script any such other device. In some embodiments, the call center server 112 may maintain a queue of calls that are waiting to speak to a customer service agent. In some embodiments, the sentiment depiction device 120 may transmit a message to the call center server 112 instructing it to move or prioritize a particular call, based on the indication of the detected customer voice characteristic of the customer. Lastly, in response to detecting that the customer has a particular accent, the system 100 may cause the call to the call center server to be connected to a particular customer service agent or group of agents at call center server 112 or CSR terminal 122. Pairing a customer with a customer service agent having a similar accent or who is from the same region may allow the customer to more easily communicate with the customer service agent, thereby enhancing the customer's experience.

Figure 5:
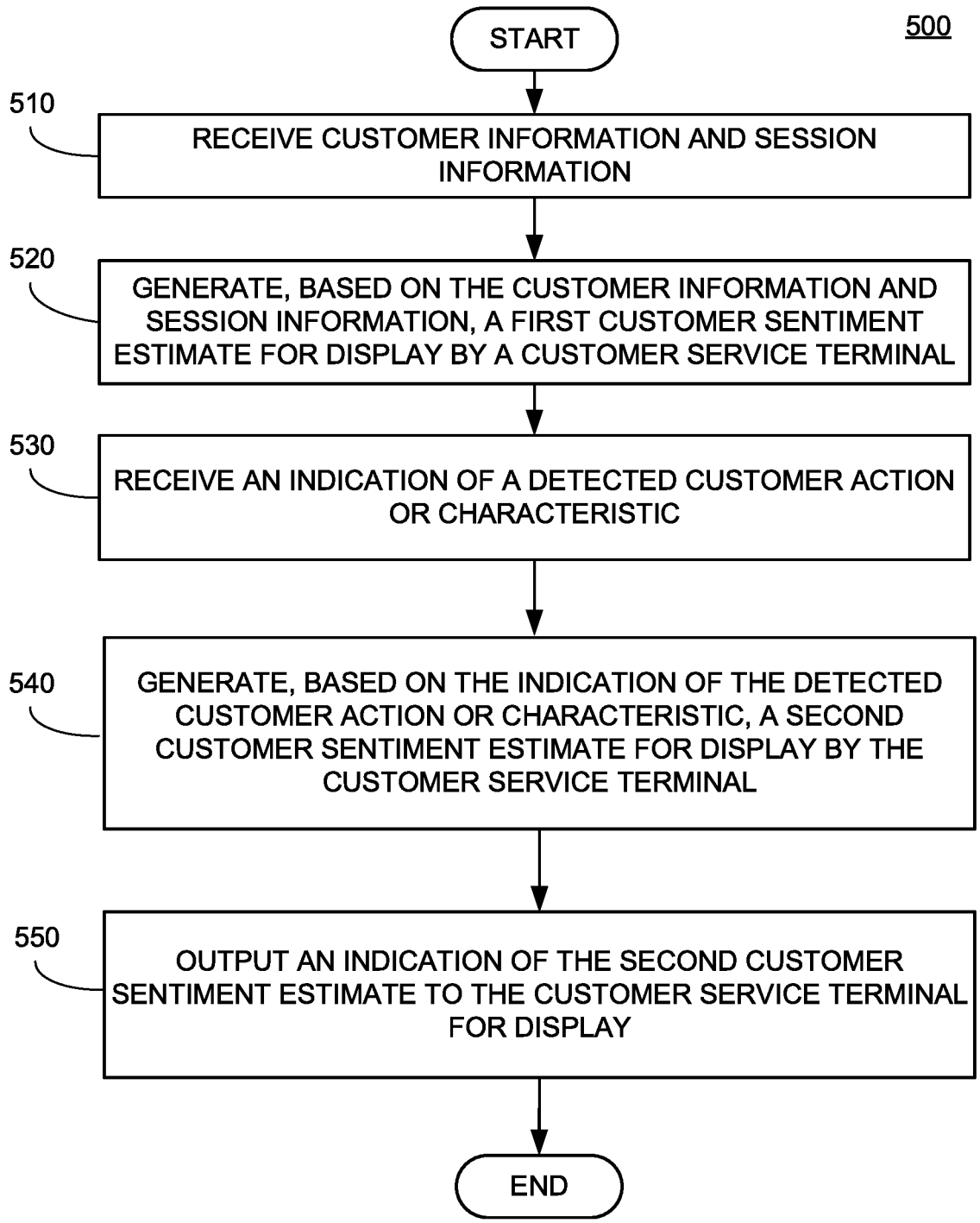
FIG. 5 is a flowchart of an exemplary system for providing customer sentiment depiction.

FIG. 5 shows a flowchart of a method 500 for providing customer service depiction. At block 510, sentiment depiction device 120 may receive customer information and session information in response to a customer interaction with an automated customer service system, such as an IVR system or website chatbot associated with organization 108. For example, a sentiment depiction device 120 may receive customer information and session information in response to a customer initiating a call to call center server 112 using user device 102. In some embodiments, customer information may include customer account data, customer interaction data, and/or customer feedback data. Customer account data may include account information such as car loan account information, mortgage account information, and credit card account information. Further, customer information may include biographical information associated with a particular customer, such as the customer's name, birthday, age, sex, nationality, and address. In some embodiments, session information may include information relating to the customer service call session, such as for example, the amount of time the customer had to wait before being connected to an IVR system or a customer service agent, the amount of time a customer interacted with an IVR system or website chatbot before being connected to a customer service agent, the number of transfers the customer experiences during the call session, transfers times, customer inputs received in response to prompts from an IVR system or website chatbot, such as authentication data and responses to questions posed by the IVR system or chatbot, the topic or nature of inquiry raised by the customer, the location of the customer (e.g., obtained via a geographic location sensor of user device 102 and communicated to call center server 112 or web server 110), IVR selection activity, user voice commands, and any other information relating to the customer's interaction with the system 100 in the immediate instance.

At block 520, sentiment depiction device 120 may generate, based on the customer information and session information, a first customer sentiment estimate that is indicative of a sentiment of the customer engaging with the automated customer service system. In some embodiments, the first customer sentiment estimate may be configured to be displayed by, for example, a customer service terminal (i.e., CSR terminal 122). In some embodiments, a customer sentiment estimate may represent a customer's estimated level of happiness according to a predetermined scale. For example, according to some embodiments, a customer sentiment estimate may be displayed as a score on a scale of 1-100, or may be displayed as a colored icon where different colors represent different levels of happiness or different emotional states. In some embodiments, a customer sentiment estimate may include displayable information relating to past transactions, past interactions, or business accounts associated with the customer. According to some embodiments, the customer sentiment estimate may be generated using predictive modeling based on the customer information and the session information. For example, predictive modeling may use machine learning techniques and algorithms to select relevant attributes from all of the data included in the customer information, session information, the customer voice characteristic or detected customer action to determine an estimate of the customer's current sentiment and determine actions that may serve to improve the customer's sentiment. In some embodiments, information input by a customer service representative regarding their perception of the customer's sentiment during an interaction with the customer may also be included in the analysis. Using predictive modeling, it may be possible to predict the customer's sentiment based on the customer's past interactions with the organization 108, feedback received from the customer (e.g., surveys filled out by the customer), and information pertaining to the current customer service call, such as how long the customer has been on hold for or whether it is raining at the location of the customer.

At block 530, sentiment depiction device 120 may receive an indication of a detected customer action or customer voice characteristic, from, for example, user device 102 or call center server 112. In some embodiments, a customer action may be detected by monitoring the customer inputs into user device 102, by for example, monitoring the movement of a cursor on a website or keystrokes entered on the user device 102. In some embodiments, a customer action may include one or more of curser movement on a website, rate of typing, rate or delay in response to prompts from a website chatbot, whether a typed response is deleted and/or modified before responding to a prompt from a website chatbot, transactions attempted, movement of user device, or any other interaction with a website or other automated system using user device 102. According to some embodiments, a customer voice characteristic may be detected by analyzing an audio signal obtained from, for example, a microphone of a user device 102. In some embodiments, a customer voice characteristic may include one or more of a customer's accent, tone of voice, rate of speech, volume level, diction, or a particular word or phrase spoken by the customer.

At block 540, sentiment depiction device 120 may generate a second customer sentiment estimate based on the indication of the detected customer action or customer voice characteristic. According to some embodiments, the second customer sentiment estimate may represent an updated version of the first customer sentiment estimate generated at step 520. For example, a detected customer voice characteristic may indicate that the customer has an angry tone of voice, and accordingly a depiction of the customer sentiment estimate may change colors (from for example, blue to red) to indicate that the customer is estimated to be more angry than they were previously estimated to be at the time of the first customer sentiment estimate. According to some embodiments, the second customer sentiment estimate may be generated using predictive modeling performed by sentiment depiction device 120 (e.g., via processor 210).

At block 550, sentiment depiction device 120 may output an indication of the second customer sentiment estimate to, for example, a customer service terminal (i.e., CSR terminal 122) for display. According to some embodiments, the customer sentiment estimate may continually update as more customer actions or customer voice characteristics are detected by the system 100. Accordingly, in some embodiments, a customer service agent utilizing CSR terminal 122 may view a constant or intermittently changing depiction of the customer sentiment estimate, providing a visual indication to the customer service agent of how the sentiment of the customer is changing as the agent speaks with the customer. According to some embodiments, the method 500 may include a further step of executing a customer service action in response to a detected customer action or customer voice characteristic. For example, sentiment depiction device 120 may display or modify a script for interacting with the customer, route the customer call to a particular customer service agent or to a particular group of customer service agents based on the customer's accent, or change the position of the customer call or website connection in a queue to speak to a customer service agent. In this way, the system 100 may automatically improve or personalize the customer service experience of a customer in response to a determination regarding the customer's mood, sentiment, or disposition.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology are described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

Exemplary Use Cases

The following exemplary use case describes one example of a typical user flow pattern. It is intended solely for explanatory purposes and not in limitation. A customer may have an issue with an account and may desire to speak with a customer service agent about the issue. The customer may call (e.g., via user device 102) the customer service number of the company associated with the account and be connected to an IVR system (e.g., via call center server 112). The customer may interact with the IVR system by navigating through menu options, providing authenticating information, and answering questions posed by the IVR system. The system may record session information (e.g., by call center server 112) including for example, the nature of the issue the customer is calling about, the amount of wait time or time spent interacting with the IVR system, and the weather at or news associated with the location of the customer. The system may also detect a voice characteristic of the customer, such as, for example the fact that the customer is speaking loudly (e.g., above a predetermined volume threshold associated with that customer or an average customer), quickly (e.g., above a predetermined pace threshold associated with that customer or an average customer), or with a tone that system associates with one of a set of stored moods. The sentiment depiction device 120 may collect the session information and voice characteristic information (e.g., from call center server 112), as well as customer information (e.g., from database 118) that indicates, for example, a past survey indicating the customer was not happy with the service received and information pertaining to recent transactions by the customer (e.g., via transaction server 114). Based on the session information, customer information, and detected voice characteristic, and using predictive modeling, the sentiment depiction device 120 may generate a customer service sentiment estimate that indicates an estimate of the customer's sentiment, mood, and/or temperament, which may then be represented in an icon or some other visual arrangement to be viewed by a customer service agent (e.g., via CSR terminal 122). Accordingly, before the customer service agent is connected to the call with the customer, the customer service agent may quickly visually ascertain the mood of the customer, and as well as view any pertinent details and information relating to the customer's issue, accounts, or previous transactions. For example, the customer service agent may be able to see that a particular customer has a mortgage, two car loans, and two credit card accounts with the company, and based on the past history of interactions with the customer and the customer's tone of voice, the system (e.g., system 100) may estimate that the customer is angry and impatient (or another mood) during the current call, and may take one or more predetermined customer service actions in response. Or, because of nature of the accounts the customer has with the company, the customer service agent may determine that this is a very important customer and may take extra care in handling their call. Alternatively, the system (e.g., system 100) may automatically determine that this is a high priority call (e.g., based on the importance of the customer and their current emotional state) and automatically take some action to improve the customer's experience. For example, customer service actions may include promoting the call to the head of the queue to speak with a customer service agent, or modifying a script for interacting with the customer that is used by the customer service agent to provide more personalized customer service.

Another use case would be for providing a customer service agent with a depiction of an estimate of a customer sentiment based on the customer's interactions with the company's website. For example, a customer be viewing the company's website on a user device 102 (e.g., a computer), and may be presented with an automated chat window (via, e.g., web server 110). The customer may interact with an automated chatbot by typing responses to prompts from the chatbot. The system (e.g., system 100) may collect session information, customer information, and may detect a customer action or characteristic based on the customer's interactions with the website. For example, the system may detect that the customer is typing or responding quickly, typing or responding slowly, typing sporadically, frequently deleting and retyping messages, using all caps, or some other indication of the customer's emotional state. Similar to the use case above, the sentiment depiction device 120 may use some or all of this information to generate a customer sentiment estimate for display to a customer service agent (via, e.g., CSR terminal 122) to provide a visual indication to the customer service agent of the customer's estimated emotional state. When the customer is connected to the customer service agent (e.g., by the agent taking over for the chatbot), the customer service agent may utilize this information to provide more tailored customer service to the customer.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

What is claimed is:

1. A system for providing customer sentiment depiction, comprising:
   an environmental data sensor for obtaining audio or visual data from a customer;
   an input device;
   an output device;
   one or more processors including at least a sentiment depiction processor; and
   a memory in communication with the one or more processors and storing instructions that, when executed by the one or more processors, are configured to cause the system to:
      receive, from an interactive voice response system, customer information and session information associated with the customer conducting a call with the interactive voice response system;
      obtain, with the environmental data sensor, customer audio information from the call;
      determine, with the sentiment depiction processor, a customer voice characteristic based on the customer audio information, the customer voice characteristic including an accent;
      generate, with the sentiment depiction processor, a customer sentiment estimate indicative of a sentiment of the customer based on the customer information, the session information, and the customer voice characteristic;
      route the call to a first group of customer service agents based on the accent of the customer;
      modify a script for the first group of customer service agents to use to interact with the customer based on the customer sentiment estimate; and
      transmit, with the output device, the customer sentiment estimate and the script to a customer service agent in the first group of customer service agents.

2. The system of claim 1, wherein the instructions further cause the system to:
   modify a position of the call in a queue of callers based on the customer sentiment estimate.

3. The system of claim 1, wherein the customer sentiment estimate represents an estimated level of happiness according to a predetermined scale.

4. The system of claim 1, wherein the customer voice characteristic further includes one or more of: a customer tone of voice, a customer rate of speech, a customer volume level, a customer diction, or a particular word or a phrase spoken by the customer.

5. The system of claim 1, wherein the instructions further cause the system to:
   display, on one or more customer service terminals associated with the first group of customer service agents:
      (i) the customer sentiment estimate and the script, and
      (ii) a predicted complaint associated with the customer.

6. The system of claim 1, wherein the instructions further cause the system to:
   receive, from the input device, an indication of a customer action during the call;
   generate, based on the indication, a second customer sentiment estimate; and
   transmit, to one or more customer service terminals associated with the first group of customer service agents, the second customer sentiment estimate.

7. A system for providing customer sentiment depiction, comprising:
   one or more processors; and
   a memory in communication with the one or more processors and storing instructions that, when executed by the one or more processors, are configured to cause the system to:
      receive, from an interactive voice response system, customer information associated with a customer conducting a call with the interactive voice response system;
      generate a customer sentiment estimate indicative of a sentiment of the customer engaging with the interactive voice response system based on the customer information;
      detect a customer voice characteristic from the call, the customer voice characteristic including an accent;
      generate an updated customer sentiment estimate based on the customer sentiment estimate and the customer voice characteristic;
      route the call to a first group of customer service agents based on the accent;
      modify, while the call is being made, a script for the first group of customer service agents to use to interact with the customer based on the updated customer sentiment estimate; and
      transmit the updated customer sentiment estimate to one or more customer service terminals associated with the first group of customer service agents.

8. The system of claim 7, wherein the instructions further cause the system to:
   modify, while the call is being made, a position of the call in a queue of callers based on the updated customer sentiment estimate.

9. The system of claim 7, wherein the instructions further cause the system to: display, on one or more customer service terminals associated with the first group of customer service agents: (i) the customer sentiment estimate and the script, and (ii) a predicted complaint associated with the customer.

10. The system of claim 7, wherein the customer sentiment estimate includes information relating to past transactions, past interactions, or business accounts associated with the customer.

11. The system of claim 7, wherein the customer voice characteristic further includes one or more of: a customer tone of voice, a customer rate of speech, a customer volume level, a customer diction, or a particular word or a phrase spoken by the customer.

12. The system of claim 7, wherein the customer sentiment estimate represents an estimated level of happiness according to a predetermined scale.

13. The system of claim 7, wherein the instructions further cause the system to:
receive an indication of a customer action during the call;
generate a second customer sentiment estimate based on the indication; and
transmit, to the one or more customer service terminals associated with the first group of customer service agents, the second customer sentiment estimate.

14. A system for providing customer sentiment depiction, comprising:
one or more processors; and
a memory in communication with the one or more processors and storing instructions that, when executed by the one or more processors, are configured to cause the system to:
receive customer information and session information from a customer engaging with a customer service system;
generate a first customer sentiment estimate indicative of a sentiment of the customer based on the customer information and the session information;
detect a customer voice characteristic, the customer voice characteristic including an accent;
generate a second customer sentiment estimate based on the customer voice characteristic;
route the customer to a first group of customer service agents based on the accent;
initiate a customer call between the customer and a customer service agent from the first group of customer service agents;
modify, while the customer call is being made, (i) a position of the customer call in a queue of callers based on the second customer sentiment estimate and, (ii) a script for the first group of customer service agents to use to interact with the customer based on the second customer sentiment estimate; and
display, on one or more customer service terminals associated with the first group of customer service agents, the second customer sentiment estimate.

15. The system of claim 14, wherein the first customer sentiment estimate and the second customer sentiment estimate include information relating to past transactions, past interactions, or business accounts associated with the customer.

16. The system of claim 14, wherein the customer voice characteristic further includes one or more of: a customer tone of voice, a customer rate of speech, a customer volume level, a customer diction, or a particular word or a phrase spoken by the customer.

17. The system of claim 14, wherein the first customer sentiment estimate and the second customer sentiment estimate represent an estimated level of happiness according to a predetermined scale.

18. The system of claim 14, wherein the customer information comprises one or more of car loan account information, mortgage account information, and credit card account information.

19. The system of claim 14, wherein the first customer sentiment estimate and the second customer sentiment estimate are generated by a sentiment depiction device using predictive modeling, the sentiment depiction device in communication with the one or more customer service terminals.

* * * * *